3,256,370
PROCESS FOR PREPARING ALKYLENE-
DIPHOSPHONATES
Steven J. Fitch, Creve Coeur, and Shih K. Liu, Vinita
Park, Mo., assignors to Monsanto Company, a corporation of Delaware
No Drawing. Filed Dec. 13, 1962, Ser. No. 244,258
10 Claims. (Cl. 260—972)

The present invention relates to novel processes for preparing alkylenediphosphonates.

The prior art discloses two general reactions for the preparation of the alkylenediphosphonates. One such reaction, a Michaelis-Becker type reaction, proceeds according to the following equation:

$$X(CH_2)_nX + 2MOP(OR)_2 \rightarrow (RO)_2OP(CH_2)_nPO(OR)_2 + 2MX$$

where M is an alkali metal, X a halogen, and $n$ is an integer from 1 to about 20. The other reaction, commonly called the Arbuzov-Michaelis reaction, proceeds according to the following equation:

$$X(CH_2)_nX + 2P(OR)_3 \rightarrow (RO)_2OP(CH_2)_nPO(OR)_2 + 2RX$$

where X is a halogen and $n$ is an integer from 1 to about 20. Both types of reactions work about equally well for alkylene dihalides with $n \geq 3$. However, for alkylen dihalides with $n=1$ or 2 the Michaelis-Becker and the Arbuzov-Michaelis reactions either yield the expected esters in low yield or give side products only.

Cade, J. Chem. Soc., 2266 (1959), disclosed the reaction of triethylphosphite and diethyl halomethylphosphonate but stated that only the iodo and bromo compounds were effective while diethyl chloromethylphosphonate was ineffective and did not react with triethyl phosphite.

Therefore, a principal object of this invention is to provide a novel process for preparing alkylenediphosphonates in high yields.

Another object of this invention is to provide an economical novel process for preparing alkylenediphosphonates.

A still further object of this invention is to provide a novel process for preparing alkylenediphosphonates by using the relatively available and inexpensive mono-phosphonate, omega chloroalkylenephosphonate, as one of the reactants.

A still further object of this invention is to provide a process for preparing methylene- and ethylene-diphosphonates in relatively high yields.

These and other objects will become apparent from a reading of the following detailed description.

It has now been found that alkylenediphosphonates can be prepared in good yields by the reaction of a tri-organo phosphite and an omega-chloroalkylenephosphonate in which the alkylene group contains one or two carbon atoms if the reaction is carried out at a temperature below about 220° C. and under such conditions as to effectively remove the organo-chloride by-product as it is formed. The following is the reaction in equation form:

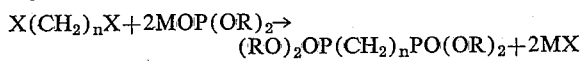

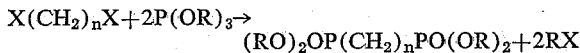

+ R$_3$Cl wherein $R_1$, $R_2$ $R_4$ and $R_5$ are selected from the class consisting of saturated and ethylenically unsaturated aliphatic hydrocarbon groups, alicyclic hydrocarbon groups, and aryl groups; $R_3$ is selected from the class consisting of saturated and ethylenically unsaturated aliphatic hydrocarbon groups and alicyclic hydrocarbon groups; and $n$ is an integer from 1 to 2 inclusive. As will be more fully discussed hereinafter $R_1$, $R_2$, $R_3$, $R_4$, and $R_5$ preferably contain not more than 6 carbon atoms in each instance since if one or all of these groups are larger than 6 carbon atoms special measures may be required to insure complete removal of the by-product without the use of temperatures in excess of those which insure the best results.

The compounds that can be prepared by the processes of the present invention are herein generically termed "alkylenediphosphonates." They can be characterized as containing a P—(C)$_n$—P linkage in their molecules, and having the formula

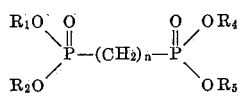

wherein $R_1$, $R_2$, $R_4$, and $R_5$ are selected from the class consisting of saturated and ethyleneically unsaturated aliphatic hydrocarbon groups, alicyclic hydrocarbon groups and aryl groups with each group preferably containing from 1 to 6 carbon atoms; and $n$ is an integer from 1 to 2 inclusive.

As can be appreciated from the foregoing, the compounds formed can contain R groups which are the same or different, thus allowing the preparation of a compound with mixed ester groups if such is desired. It should be noted that in the two widely used reactions; namely, the Michaelis-Becker and Arbuzov-Michaelis reactions, this degree of selection is not possible.

The compounds prepared by the process of this invention are useful as surface active or wetting agents, textile softening agents, plasticizers, lubricants, oil additives, and hydraulic fluids as disclosed in U.S. Patent 2,634,288. In addition, the compounds prepared by the process of this invention can be used as intermediates in the preparation of the free acids which are known sequesterants. The free acids are generally prepared by hydrolysis of the esters with a strong mineral acid.

Typical tri-organo phosphites which are suitable for use in the process are:

Trimethyl phosphite
Triethyl phosphite
Tri-n-propyl phosphite
Tri-iso-propyl phosphite
Tri-n-butyl phosphite
Tri-n-hexyl phosphite
Tri-cyclopentyl phosphite
Tri-cyclohexyl phosphite
Tri-2-propene phosphite Typical omega-chloroalkylenephosphonates which are suitable for use in the process are:

Dimethyl chloromethylphosphonate
Diethyl chloromethylphosphonate
Diethyl chloroethylphosphonate
Di-n-butyl chloroethylphosphonate
Di-n-butyl chloromethylphosphonate
Di-cyclopentyl chloromethylphosphonate
Di-cyclohexyl chloroethylphosphonate
Di-phenyl chloromethylphosphonate
Di-2-propene chloromethylphosphonate The foregoing reactants are by no means the only triorgano phosphites and omega-chloroalkylenephosphonates which can be used as reactants but are presented as indicative of the applicability of the present invention.

Tri-organo phosphites can be prepared by methods such as the following:

(1) Reaction of a phosphorous trihalide with an alcohol compound in the presence of a tertiary base, such as a tertiary amine, according to the following equation:

$$3ROH + PCl_3 + 3B \rightarrow (RO)_3P + 3B \cdot HCl$$

The reaction is usually performed at about 10 to 15° C. and after completion the amine hydrochloride is filtered off and the product isolated by distillation in vacuum.

(2) The reaction by the gradual addition of phosphorous trichloride to a sodium alkoxide suspension in an inert solvent (ether) according to the following equation:

$$3RONa + PCl_3 \rightarrow 3NaCl + P(OR)_3$$

Omega-chloroalkylenephosphonates can be prepared by methods such as the following:

(1) Preparing complexes of the type $RPCl_4 \cdot AlCl_3$ which on alcoholysis yield the dialkyl chloroalkylenephosphonate according to the following equations:

$$ClCH_2CH_2Cl + PCl_3 + AlCl_3 \rightarrow ClCH_2CH_2PCl_4 \cdot AlCl_3$$

$$ClCH_2CH_2PCl_4 \cdot AlCl_3 + ROH \rightarrow ClCH_2CH_2PO(OR)_2$$

(2) Passing of formaldehyde through $PCl_3$ to form an intermediate omega-chloroalkylphosphonic dichloride and further reacting with an alcohol at low temperatures, i.e., about 0° C., according to the following equation:

$$PCl_3 + CH_2O \longrightarrow$$

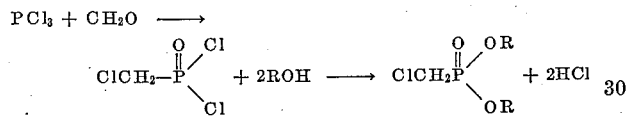

The high yields obtained and the relative cleanness of the reaction of the invention is totally unexpected especially in view of the fact that it was reported, supra, that chloromethylphosphonate and triethyl phosphite failed to yield any alkylenediphosphonate at all. There are, however, two features of the process which require elaboration. The process is dependent on the efficient removal of the organo-chloride by-product as it is formed, preferably by maintaining the temperature in excess of its boiling point in order to permit its evolution as a gas. It is believed that the presence of the organo-chloride within the process system catalyzes the rearrangement of the tri-organo phosphite to organophosphonate, as in the regular Arbuzov reaction, and as depicted by the following equation:

$$P(OR)_3 + RCl \rightarrow RP(O)(OR)_2 + RCl$$

The process is generally only suitable for triorgano phosphites containing 6 carbon atoms or less in each ester group because with larger ester groups the by-product organo-chloride formed is generally difficult to remove efficiently by its evolution as a gas, thereby permitting the aforementioned rearrangement to take place resulting in poor yields of the desired product. However, with organo-phosphites containing ester groups larger than 6 carbon atoms special measures may be used, such as the use of a diluent capable of forming an azeotrope with the by-product chloride and removing by distillation or the use of a selective solvent extractant for the by-product chloride, in order to insure the complete removal of the by-product chloride as it is formed. In addition, the omega-chloroalkylenephosphonate should preferably contain 6 carbon atoms or less in each ester group because there is the possibility of an interchange of ester groups between the reactants and, therefore, because of this possibility and the requirement for the efficient removal of the by-product chloride the ester groups of both reactants should preferably contain in each instance 6 carbon atoms or less.

The process is temperature dependent to the extent that above 220° C. a side reaction believed to be a P—O—P linkage formation dominates and the reaction product is undistillable. Also, the process becomes slow, as judged by the rate of organo-chloride evolved, while operating below about 160° C. and therefore it is preferred that the operating temperature range between about 160° and 220° C. However, temperatures may be used below 160° C. as long as the temperature is maintained above the boiling point of organo-chloride by-product obtained.

The following examples are presented to illustrate the invention with parts by weight used in the examples unless otherwise indicated.

*Example I*

Into a reaction vessel are charged 18.6 parts of diethyl chloromethylphosphonate and 32.2 parts of triethyl phosphite. This mixture is stirred and heated to reflux. A bubbler attached to the otherwise closed system checks the ethyl chloride evolution. At 160° C. the ethyl chloride comes off at a steady rate. After 17 hours of refluxing the temperature reaches about 220° C. and the gas evolution becomes quite slow. The mixture is cooled to room temperature and vacuum distilled. The tetraethyl methylenediphosphonate, $(C_2H_5O)_2OPCH_2PO(OC_2H_5)_2$, boils at 128–9°/.9 mm. with a yield of 77% based on the diethyl chloromethylphosphonate reactant. The identity is established by $H^1NMR$ with the appearance of a 1:3:1 triplet having a coupling constant of 22 cps. This establishes the existence of P—C—P molecular linkage. Furthermore, the ratio of (O—$CH_2$) hydrogens to (P—C—P) hydrogens to —$CH_3$ hydrogens is 8 to 2 to 12 respectively, and is consistent with the tetraethyl methylenediphosphonate structure.

*Example II*

The foregoing Example I was repeated utilizing the same ratio of reactants and refluxing at 160–180° C. for 74 hours resulting in tetraethyl methylenediphosphonate with a yield of 83%.

*Example III*

Into a reaction vessel are charged 700 parts of diethyl chloroethylphosphonate and 576 parts of triethyl phosphite. The mixture is stirred and heated to reflux at about 180°–200° C. for 24 hours, after which the mixture is cooled to room temperature and vacuum distilled. The tetraethyl ethylenediphosphonate $$(C_2H_5O)_2OPCH_2CH_2PO(OC_2H_5)_2$$

is produced in comparable yields as the products obtained in Examples I and II.

Other compounds which can be prepared by the process of the instant invention and substantially in like manner as the compounds disclosed in the foregoing examples include:

Tetra-2-propene methylenediphosphonate
Tetra-2-propene ethylenediphosphonate
Tetra-cyclopentyl methylenediphosphonate
Tetra-cyclohexyl methylenediphosphonate
Tetra-n-hexyl ethylenediphosphonate
Dimethyl,diethyl methylenediphosphonate
Diethyl, di-n-butyl methylenediphosphonate Although the processes of the instant invention have been described with a degree of particularity, the invention herein is intended to be limited only by the claims set forth hereinafter.

What is claimed is:

1. The process for preparing alkylenediphosphonates comprising reacting a tri-organo phosphite having the formula

wherein $R_1$ and $R_2$ are radicals selected from the class consisting of saturated and ethylenically unsaturated aliphatic hydrocarbyl, alicyclic hydrocarbyl and aryl radicals, $R_3$ is a radical selected from the class consisting of saturated and ethylenically unsaturated aliphatic hydrocarbyl, and alicyclic hydrocarbyl radicals, with an omega-chloroalkylene-phosphonate having the formula

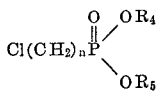

wherein $R_4$ and $R_5$ are radicals selected from the class consisting of saturated and ethylenically unsaturated aliphatic hydrocarbyl, alicyclic hydrocarbyl and aryl radicals, and $n$ is an integer from 1 to 2 inclusive; said process being carried out at a temperature of not greater than 220° C. and under such conditions as to effectively remove from the reaction zone the by-product chloride as it is formed.

2. The process of claim 1, wherein said process is carried out within a temperature range of from about 160° C. to 220° C.

3. The process of claim 1, wherein the sum of the carbon atoms in each of the radicals represented by $R_1$, $R_2$ and $R_3$ of said tri-organo-phosphite is not greater than 6 and the sum of the carbon atoms in each of the radicals represented by $R_4$ and $R_5$ of said omega-chloroalkylene-phosphonate is not greater than 6.

4. The process of claim 3, wherein said process is carried out within a temperature range of from about 160° C. to 220° C.

5. The process of claim 3, wherein the $n$ of said omega-chloroalkylenephosphonate is the integer 1.

6. The process of claim 5, wherein said process is carried out within a temperature range of from about 160° C. to 220° C.

7. The process of claim 3, wherein the $n$ of said omega-chloroalkylenephosphonate is 2 and wherein said process is carried out within a temperature range of from about 160° C. to 220° C.

8. The process for preparing tetraethyl methylenediphosphonate comprising reacting triethyl phosphite and diethyl chloromethylphosphonate, said process being carried out within a temperature range of from about 160° C. to 220° C. and under such conditions as to effectively remove from the reaction zone the by-product chloride as it is formed.

9. The process for preparing tetraethyl ethylenediphosphonate comprising reacting triethyl phosphite and diethyl chloroethylphosphonate, said process being carried out within a temperature range of from about 160° C. to 220° C. and under such conditions as to effectively remove from the reaction zone the by-product chloride as it is formed.

10. The process for preparing tetra-2-propene methylenediphosphonate comprising reacting tri-2-propene phosphite and di-2-propene chloromethylphosphonate, said process being carried out within a temperature range of from about 160° C. to 220° C. and under such conditions as to effectively remove from the reaction zone the by-product chloride as it is formed.

References Cited by the Examiner

UNITED STATES PATENTS 2,573,568   10/1951   Harman et al. _ 260—461.303 XR
2,599,761   6/1952    Harman et al. _ 260—461.303 XR
2,634,288   4/1953    Boyer et al. __ 260—461.303 XR

OTHER REFERENCES

Daniels, "Outlines of Physical Chemistry," 7th Ed. (1943), John Wiley and Sons, Inc., New York, New York, pp. 273–276.

CHARLES B. PARKER, *Primary Examiner.*

IRVING MARCUS, *Examiner.*

FRANK M. SIKORA, R. L. RAYMOND,
*Assistant Examiners.*